United States Patent [19]

Sugino et al.

[11] Patent Number: 5,196,687

[45] Date of Patent: Mar. 23, 1993

[54] CARD READER HAVING LOCKING MECHANISM

[75] Inventors: Kiyotaka Sugino; Teruyoshi Yufu; Masayuki Ishii, all of Kusatsu, Japan

[73] Assignee: Omron Tateisi Electronics Co., Kyoto, Japan

[21] Appl. No.: 421,777

[22] Filed: Oct. 16, 1989

[30] Foreign Application Priority Data

| Oct. 14, 1988 | [JP] | Japan | 63-134838[U] |
| Nov. 4, 1988 | [JP] | Japan | 63-279942 |
| Nov. 8, 1988 | [JP] | Japan | 63-282125 |
| Jan. 5, 1989 | [JP] | Japan | 64-657 |

[51] Int. Cl.⁵ ............... G06K 13/06; G06K 13/24; G06K 7/06; G06K 13/04
[52] U.S. Cl. .................. 235/483; 235/441; 235/479; 235/486
[58] Field of Search .............. 235/441, 492, 486, 479, 235/475, 476, 480, 483, 477, 435, 449, 482, 449; 360/109

[56] References Cited

U.S. PATENT DOCUMENTS

| 4,167,664 | 9/1979 | Pass | 235/449 |
| 4,316,226 | 2/1982 | Nakamichi et al. | 360/109 |
| 4,527,052 | 7/1985 | Kilborn | 235/475 |
| 4,724,310 | 2/1988 | Shimamura et al. | 235/486 |
| 4,734,567 | 3/1988 | Hansbauer | 235/486 |
| 4,833,310 | 5/1989 | Shimamura et al. | 235/492 |
| 4,843,221 | 6/1989 | Ohtsuki et al. | 235/486 |
| 4,914,279 | 4/1990 | Massey | 235/482 |
| 5,036,184 | 7/1991 | Sasaki | 235/479 |

FOREIGN PATENT DOCUMENTS

| 3412453 | 4/1984 | Denmark . | |
| 8805789 | 5/1988 | Denmark . | |
| 0167356 | 1/1986 | European Pat. Off. | 235/475 |
| 0232115 | 1/1987 | European Pat. Off. . | |
| 0255435 | 2/1988 | European Pat. Off. | 235/486 |
| 61-241867 | 10/1986 | Japan . | |

OTHER PUBLICATIONS

IBM Technical Disclosure Bulletin, vol. 27, No. 7B, Dec. 1984, pp. 4314-4315, New York, US; G. E. Doody et al.: "Captured badge reader".
Patent Abstracts of Japan, vol. 9, No. 296 (P-407) (2019), Nov. 22, 1985; & JP-A-60 132 288 (Fujitsu K.K.) Jul. 15, 1985.

Primary Examiner—Eugene R. Laroche
Assistant Examiner—Christopher R. Glembocki
Attorney, Agent, or Firm—Dickstein, Shapiro & Morin

[57] ABSTRACT

A composite card reader (11) used for IC cards, magnetic cards and the like to which the card is manually inserted and extracted is disclosed. The composite type card reader (11) has a shutter lever (28) for opening and closing a card inlet (13), a locking mechanism for locking the card by closing the shutter lever (28), and a lock releasing mechanism for releasing the lock by opening the shutter lever (28). A shutter closing lever (32) included in the locking mechanism and a shutter opening lever (30) included in the lock releasing mechanism can be alternately engaged with a roller (38) included in a link mechanism (29) coupled to the shutter lever (28). In order to maintain the lock released state by the lock releasing mechanism, a shutter linked lever (80) which is moved in relation to the shutter lever (28) has its position regulated by a slider (19) which slides in response to the insertion of the card (12). A controlling portion including a CPU (1) is provided, which prohibits operation of the locking mechanism when insertion of a magnetic card is detected by a magnetic head (26). The magnetic head (26) is supported by a frame (62) having a projection (69) on one end, which can swing with a contact point between the projection (69) and a support base (65) being a support point of swinging.

4 Claims, 12 Drawing Sheets

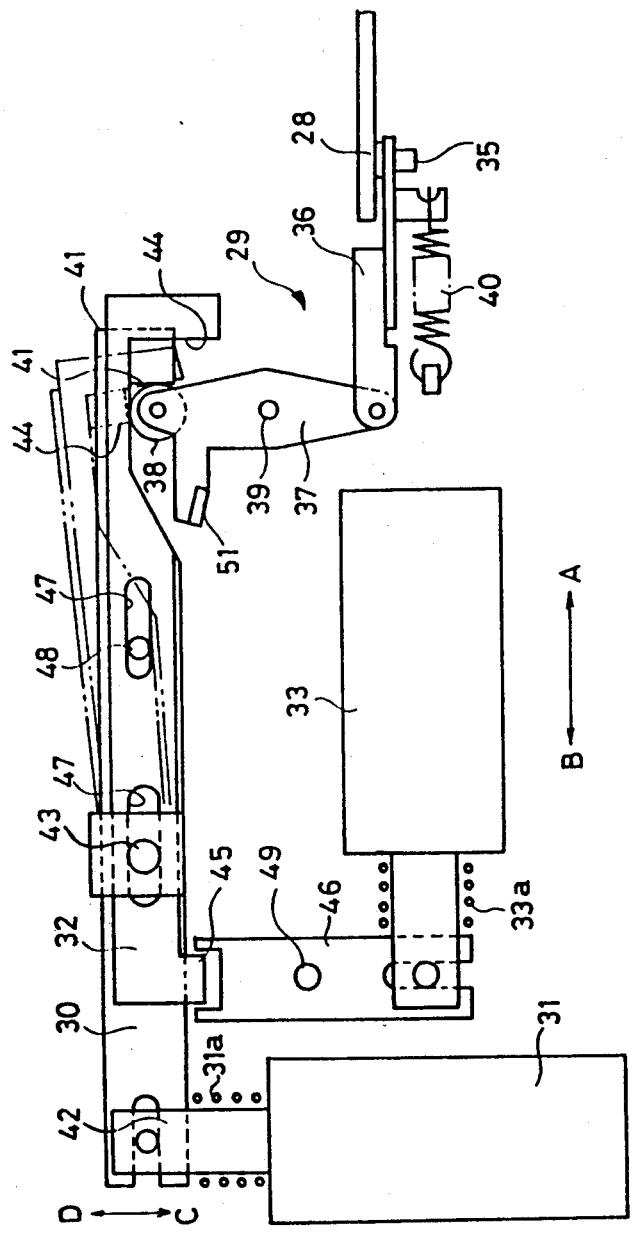
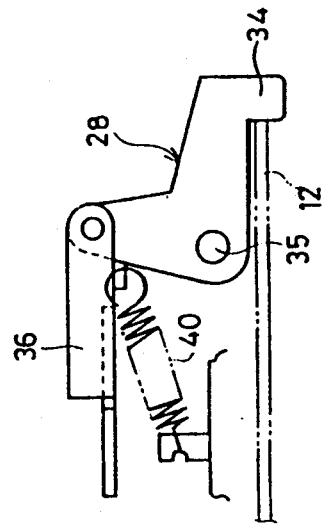

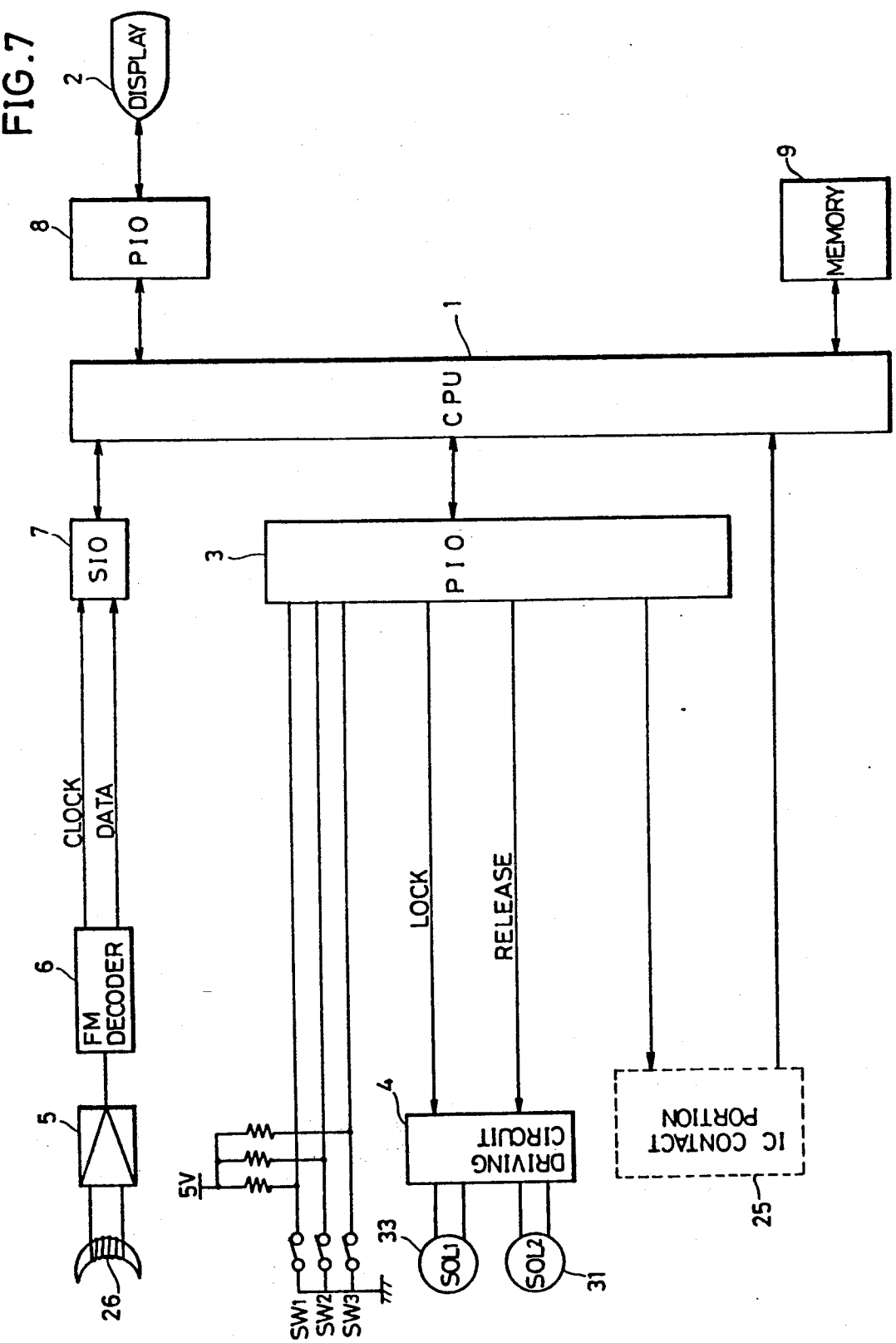

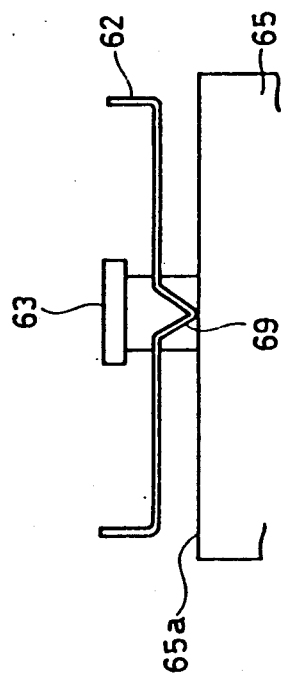
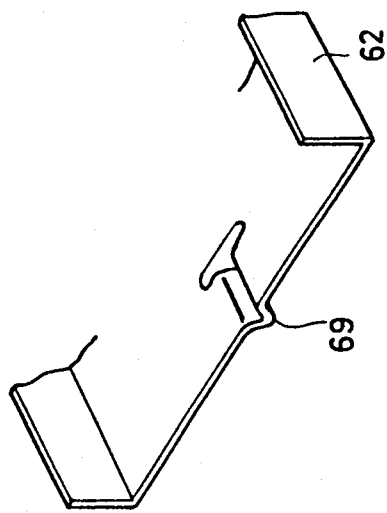
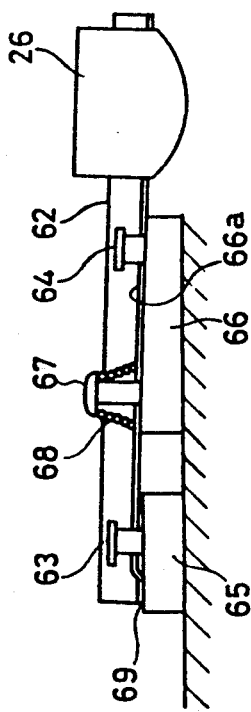
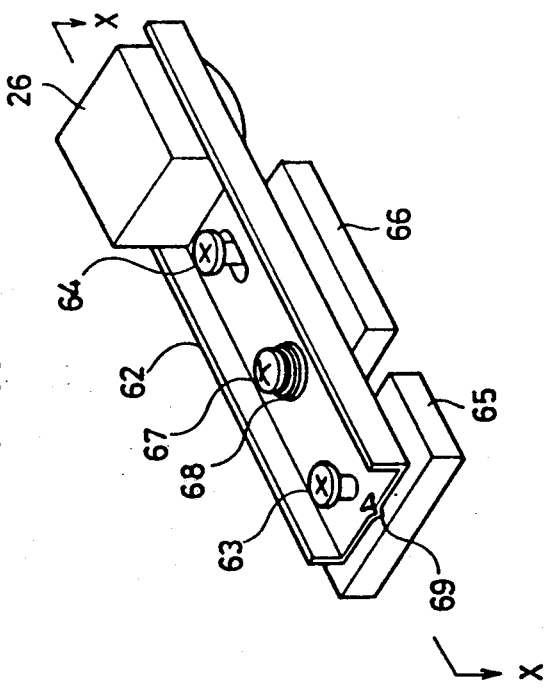

CARD READER HAVING LOCKING MECHANISM

BACKGROUND OF THE INVENTION

Field of the Invention

The present invention relates to a card reader, and more specifically, to a card reader to which a card is manually inserted and extracted, having a card locking mechanism.

Description of the Background Art

A composite type card reader to which IC cards and magnetic cards are both used has been known.

Generally, the composite card reader of this type has a slider in it, which slider moves forward and rearward in relation to the insertion/extraction of the card. By the sliding operation of this slider, an IC contact bush in the reader is brought into contact with the IC contact point of the card, and a magnetic head is brought into contact with the magnetic stripe, so as to process data.

As to the insertion/extraction of the card, when a customer manually inserts the card with the rear end portion of the card held by his hand for card transaction, a locking mechanism operates and locks the card. When the data processing is finished, a lock releasing mechanism operates to release the lock of the card.

However, sometimes the card happens to be erroneously extracted by a customer during processing of the data on the card, since the card locking mechanism with imperfect. Sometimes the card can not be extracted as the automatic locking cannot be released as the friction resistance in the engaging portion of the card reader is increased as the customer keeps holding the rear end of the card.

The reading from a magnetic card by a magnetic head can be carried out with smaller errors when reading is carried out during the extracting operation, due to the operational characteristics. Therefore, after the card is inserted, it is necessary to instruct extraction of the card to the customer, to carry out reading during extraction.

However, in the above mentioned system in which the inserted card is once automatically locked no matter whether it is an IC card or not, when a magnetic card is inserted, the locking must be released before extraction. Therefore, there is a loss of time generated by the locking and the lock releasing operation which prevents smooth and speedy processing of the card.

A lock releasing structure in which the card is pushed outward with force by a spring pressure in the reader when the lock is released, cannot be applied to a card reader in which the data is processed by the magnetic head during extraction of the card. A lock releasing mechanism preventing leaping out of the card may be employed. However, when the extracting operation of the card is delayed, the card is locked again and cannot be extracted. In view of the foregoing, an open state may be maintained or locked by keeping ON a lock releasing solenoid for a long period of time. However, in that case, the solenoid is damaged by heat. In addition, the magnetic head for reading or writing information from and to the card by scanning the magnetic track of the magnetic card inserted into the card reader must be adapted to respond to a deformation of the magnetic card, if any, so as to accurately scan the magnetic track.

SUMMARY OF THE INVENTION

An object of the present invention is to provide a card reader capable of surely locking a card during card transaction and capable of smooth lock releasing operation even if an external force is applied as the card is pulled.

Another object of the present invention is to provide a card reader capable of surely and stably carrying out extraction of a card by maintaining a lock released state when card is extracted.

A further object of the present invention is to provide a composite type card reader which determines whether the card is a magnetic card or not in card transaction and does not lock the card as it is determined to be a magnetic card.

A still further object of the present invention is to provide a magnetic head supporting apparatus supporting the magnetic head such that the head can move in response to concaves and convexes of the card surface.

In a card reader of the present invention, closing driving means operates to close a shutter lever in response to a card inserting operation, and the inserted card is locked. The data on the card are processed in this state. After the data are processed, the shutter lever is opened by opening driving means, permitting extraction of the card. During the series of opening and closing operation of the shutter lever, a roller provided in a link mechanism engaging a closing lever and an opening lever facilitates smooth contact, so that stable opening and closing operation is realized.

Consequently, during the opening and closing operation of the shutter lever, smooth engaging can be provided by the rolling of the roller, avoiding the friction resistance. Therefore, the driving power of the opening and closing driving means for the engaging and disengaging operation can be set smaller, and accordingly, the apparatus can be made compact and the cost thereof can be reduced. Even if an external force to extract the card is applied, for example by a customer holding the rear end of the card during processing of the data on the card, the friction resistance at the engaging portions is not increased by virtue of the smooth engaging operation of the roller, so that there is no trouble in the lock releasing operation. Therefore, the extraction of the card can be carried out stably regardless of the presence/absence of an external force applied to the card.

In another aspect of the present invention, a lock released state is maintained after the lock is released. In a further aspect of the present invention, a slider moves forward in response to an insertion of a card into an inlet, and a shutter lever is closed by a position regulation releasing operation of a shutter linked lever related to the forward movement. Thus, the inserted card is locked. IC data processing, for example, is carried out in this locked state. After the IC data are processed, the shutter lever is opened by the driving means to permit extraction of the card, and by the related movement of an engaging member, the shutter linked lever is operated to realize open lock. Consequently, the inlet is kept at the open state, ensuring extraction of the card.

Consequently, when the card is extracted, the shutter lever is kept open, permitting extraction of the card. Therefore, even if the extracting operation of the card is delayed, the shutter lever is not locked again, ensuring extraction of the card.

In a composite type card reader in accordance with the present invention, detection of magnetism is carried out on an inserted card by a magnetic head so as to determine whether the inserted card is an IC card or a magnetic card. When it is an IC card, the card is locked. If it is a magnetic card, the card is not locked.

Therefore, when the card is a magnetic card, the card is not locked, whereby extraction of the card can be immediately carried out, reducing the time of card processing, and, as the reading operation is carried out during extraction, reliability in reading can be improved.

In the magnetic head supporting apparatus of the present invention, a point at which a projection of a movable frame is in contact with a support base serves as a support point of swing of the movable frame. Consequently, one point serves as the support point and the support point does not move even if the direction of swing changes.

Therefore, the magnetic head can move in response to the concaves and convexes of a card deformed. The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a plan view showing an inner structure of the composite type card reader shown in FIG. 1 in which a card is locked;

FIG. 4 illustrates engaging operation of the composite type card reader shown in FIG. 1 when the card lock is leased;

FIG. 5 is a side view of main portions of the composite type card reader shown in FIG. 1 in a card locked state;

FIG. 7 is a schematic block diagram showing electric circuits of the composite type card reader in accordance with one embodiment of the present invention;

FIG. 9 is a perspective view showing a magnetic head supporting portion applied to the composite type card reader of one embodiment of the present invention;

FIG. 10 is a cross sectional view of the supporting portion taken along the line X—X of FIG. 9;

FIG. 11 is an enlarged view of a main portion of a movable frame shown in FIG. 9;

FIG. 12 is an enlarged view of a supporting point portion of the movable frame shown in FIG. 9;

DESCRIPTION OF THE PREFERRED EMBODIMENTS

In the embodiments, a composite card reader can handle IC cards, magnetic cards and cards having both functions of these cards. One of such cards is manually inserted into the composite card reader and the transaction data on the card are processed therein.

Figure 1:
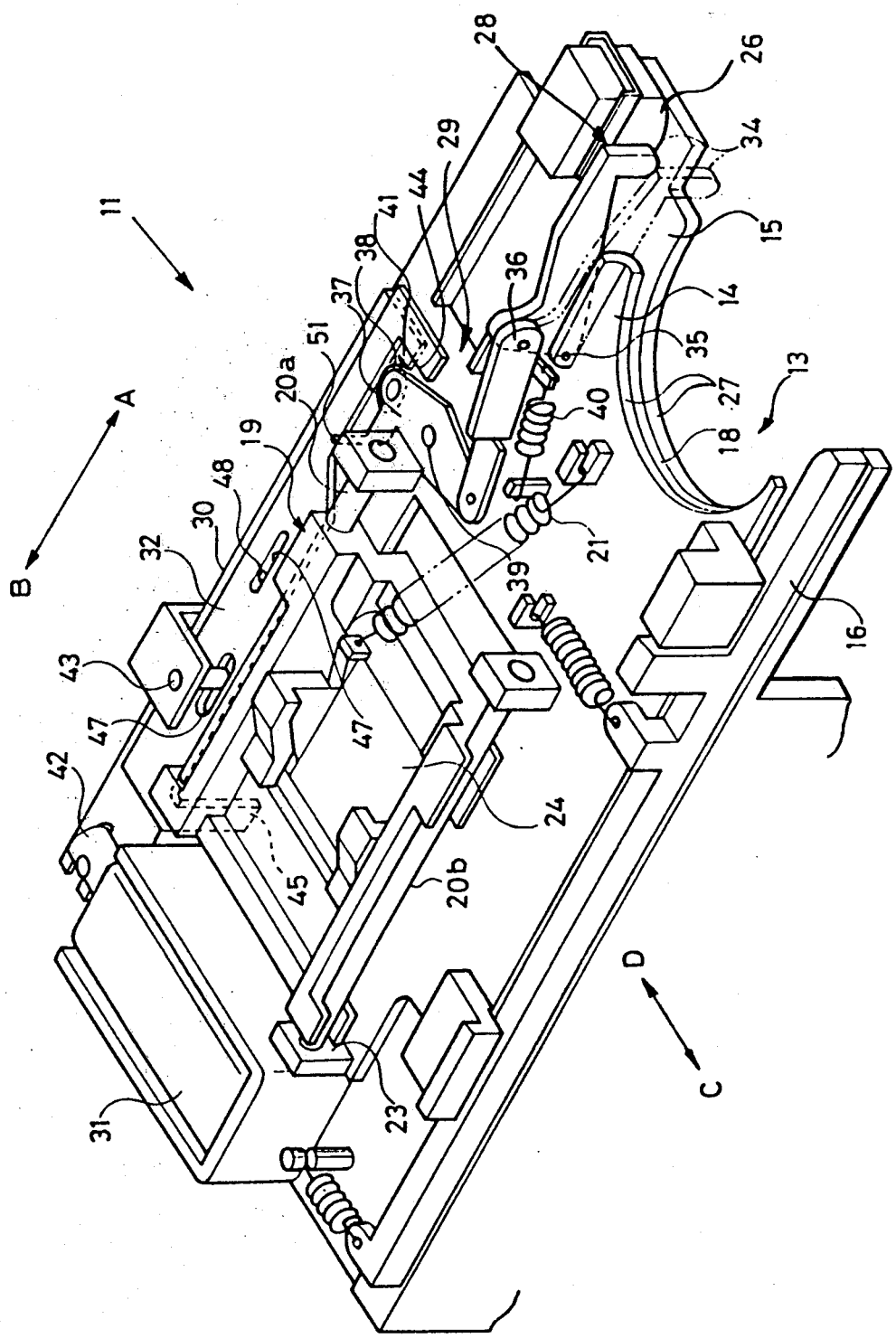
FIG. 1 is a perspective view of a composite type card reader in accordance with one embodiment of the present invention.
Figure 2:
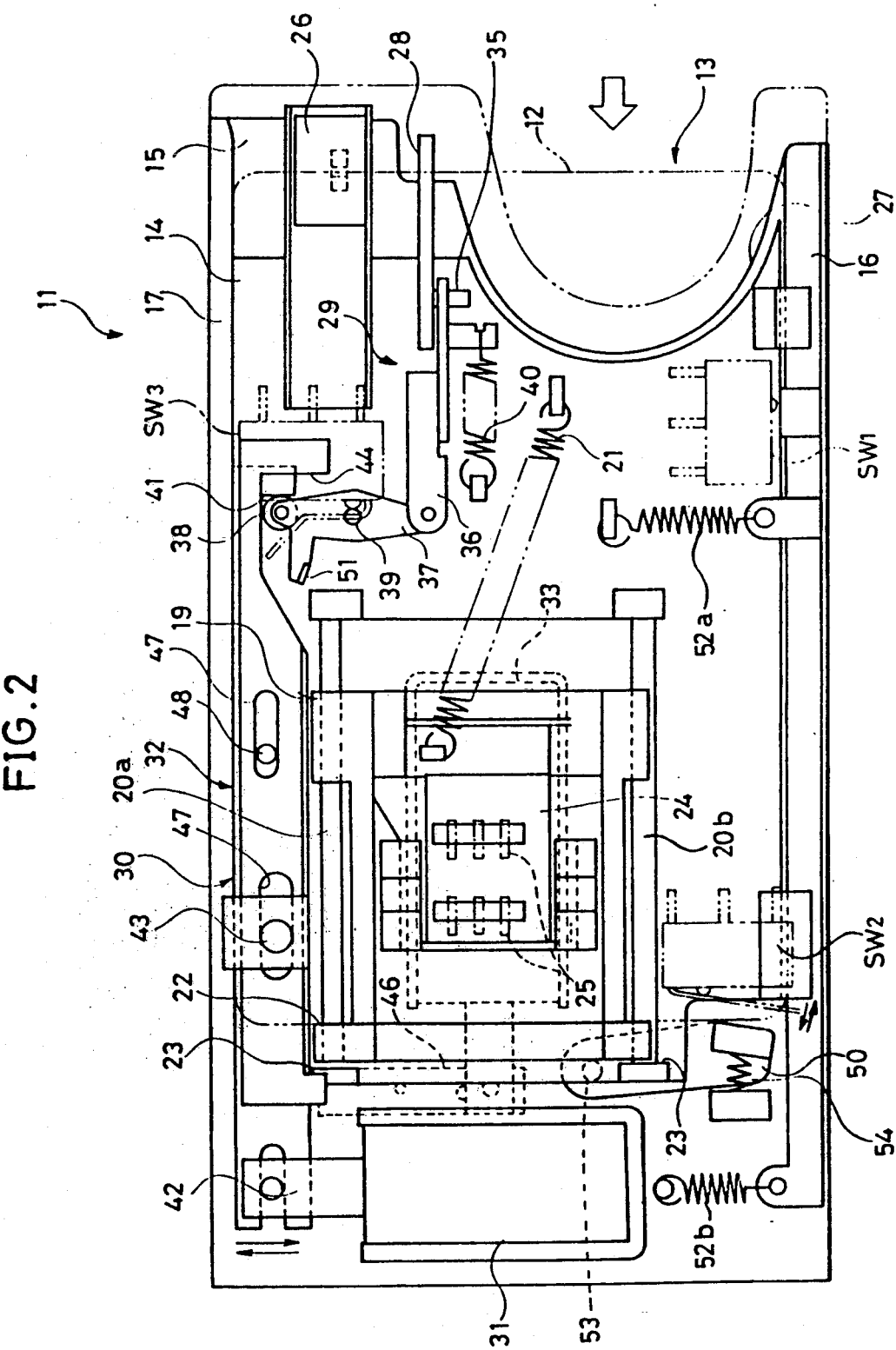
FIG. 2 is a plan view of the composite type card reader shown in FIG. 1.

Referring to FIGS. 1 and 2, the above mentioned composite card reader 11 has a card inlet 13 on a front surface through which a card 12 is inserted. A slider 19 sliding forward and rearward (directions shown by the arrows A and B) in response to inserting/extracting of the card 12 is provided in a card path 18 which is surrounded by an upper plate 14, a lower plate 15, a left plate 16 and a right plate 17 defining the card inlet.

The above mentioned slider 19 has both sides axially supported by slide axes 20a and 20b to be slidable in the direction of insertion/extraction of the card 12. Normally, the slider 19 is positioned on the side of the card inlet 13 by means of a spring 21 (hereinafter this state is called a standby state).

A card receiving member 22 is provided projected to the card path 18 on an end portion on the B side of the slider 19. When a front edge of the card 12 inserted through the card inlet 13 meets with the card receiving member 22, the slider 19 slides to a position of a slider stopper surface 23 in the direction of the arrow B against the biasing force of the spring 21.

When the slider 19 moves forward to the stopper position, then a plurality of contact brushes 25 of a tilt lever 24 attached to the slider 19 are brought into contact with a plurality of IC contact points on the IC card. The IC data is processed in this state.

A magnetic stripe of a magnetic card inserted to the card path 18 is brought into contact with a magnetic head 26 arranged on an end portion on the A side of the card path 18. Consequently, magnetic data are processed.

An arc concave 27 is formed on the inlet 13 so as to accept fingers at the time of manual insertion/extraction, and a shutter lever 28 for permitting and forbidding insertion and extraction of the card 12 to the card inlet 13 is arranged on the card inlet 13.

When the data of the IC card are being processed, the shutter lever 28 is moved downward (card locked state), so as to prevent unexpected extraction of the IC card. When the data processing is completed, the lever is moved upward (locked released state), so as to permit extraction of the IC card. The opening/closing operations of the shutter lever 28 are carried out in relation to the ON.OFF operation of a lock releasing solenoid 31 through a linking mechanism 29 and a shutter opening lever 30, and to the ON.OFF operation of a locking solenoid 33 through the linking mechanism 29 and a shutter closing lever 32.

The shutter lever 28 has a shutter piece 34 bent downward on a tip end portion of the lever. The lever 28 is axially supported at the lower end portion on the B side by a support pin 35 horizontally positioned in the directions shown by the arrows C and D of the upper surface of the upper plate 14. The upper end portion on the B side of the lever 28 is coupled to a first link piece 36 of the linking mechanism. The shutter lever 28 is turned about the support pin 35 by moving forward and rearward the first link piece 36. Consequently, the shutter piece 34 is moved upward and downward. When the shutter piece 34 is moved upward, it opens the card inlet 13. When it is moved downward, it closes the card inlet 13.

The above described link 29 is consisted of a first link piece 36 and a second link piece 37 continuously and pivotally attached thereto. An end portion on the A side of the first link piece 36 is pivotally attached to the above described shutter lever 28 and an end portion on the B side is pivotally attached to one end of the rhomboid second link piece 37 arranged approximately orthogonal to the link piece 36. An engaging roller 38 is pivotally attached to the other end of the link piece 37. The second link piece 37 is axially supported by a support pin 39 at the central portion thereof so as to be freely rotatable on the upper plate 14. By turning the second link piece 37 with the support pin 39, the shutter piece 34 of the shutter lever 28 moves upward and downward through the first link piece 36. When the slider 19 is in the standby state, the shutter lever 28 is at an elevated position by the function of a biased spring forcing the shutter lever upward, so that the insertion of the card is permitted.

The above described shutter opening lever 30 is arranged longitudinally along the directions of insertion and extraction of the card (directions shown by the arrows A and B), as shown in FIG. 3. The engaging roller 38 of the above mentioned second link piece 37 is freely engaged with and detached from an L-shaped engaging portion 41 formed on the chip end portion of the lever. The lever has its end portion on the B side orthogonally and pivotally attached to a rod 42 of a lock releasing solenoid 31 and its intermediate portion axially supported by a support pin 43, so that it can be tilted with the support pin 43.

When the lock releasing solenoid 31 is turned on in the card locked state, then the rod 42 moves in the direction of the arrow C. Accordingly, the shutter opening lever 30 is tilted, and the engaging roller 38 is disengaged from the L-shaped engaging portion 41 as shown in FIG. 4. By the function of the biased spring 40, the second link piece 37 is inclined such that the engaging roller 38 is positioned nearer to the A side than the support pin 39, and the link mechanism 29 is reset to the initial position. Consequently, the shutter lever 28 is moved upward, permitting extraction of the card.

The shutter closing lever 32 is arranged longitudinally in the same direction on the upper surface of the above mentioned shutter opening lever 30. The engaging roller 38 of the above mentioned second link piece 37 is freely engaged with and detached from an L-shaped engaging portion 44 formed on the tip end portion of the lever. A piece 45 for engagement projected downward on an end portion on the B side of the lever 32 is connected to a locking solenoid 33 through a lock lever 46 axially supported by a support pin 49.

In the lock released state, when the lock solenoid 33 is turned on, then the lock lever 46 and the shutter closing lever 32 are inclined correspondingly, and the engaging portion 44 moves from the position shown by the solid line to a position shown by the two dotted line shown in FIG. 3. Consequently, the second link piece 37 is pressed by the engaging portion 44 and rotated counterclockwise. When the second link piece 37 rotates by a prescribed angle, then the engaging roller 38 is disengaged from the engaging portion 44 as shown in FIG. 3, and it is brought into contact with the engaging portion 41 which is positioned nearer to the A side than the engaging portion 44 at this time. Consequently, the shutter lever 28 is moved downward, locking the inserted card as shown in FIG. 5, thereby preventing extraction of the card. A spring 31a is provided on the lock releasing solenoid 31 for returning the lever 30 to a state before the tilting, when the solenoid is not on. A similar spring 33a is also provided on the locking solenoid 33. A lever slide pin 48 fixed on the lever 30 is adapted to be engaged with a lever slide hole 47 provided on the lever 32, so that the relative positions of the levers 30 and 32 are regulated and the levers are operated approximately parallel to each other.

By the above described structure, the engaging roller 38 is switched being in contact with inner surfaces of the L-shaped engaging portions 41 and 44 of the levers 30 and 32. The shutter lever 28 is opened and closed smooth by the rolling of the engaging roller 38.

The left side plate 16 is used for detecting insertion of the card as well for defining the card path 18. Namely, the left plate 16 functions as a card insertion detection plate. The card insertion detection plate 16 is pulled to the body frame side (in the direction of the arrow D) by means of two coil springs 52a and 52b suspended between the plate 16 and the upper plate 14 of the body frame, so that the lateral width of the card path 18 is made little narrower than the width of the card.

Therefore, when the card is inserted, the card 12 moves the card insertion detecting plate 16 against the coil springs. A detecting switch SW1 having a contact is provided as shown in FIG. 2 so as to detect the start of card insertion by this movement.

A detecting lever 50 is provided which is pressed and turned by the card 12 when the slider 19 is slid to a card insertion completed position. The lever 50 has a support point 53 and normally it is biased to a switch SW2 having a contact by the force of a coil spring 54 which is compressed and interposed between the lever and the body frame.

The lever 50 is turned by the insertion of the card 12, and it is moved away from the switch SW2. This switch SW2 detects a completion of card insertion.

A switch SW3 is a shutter lock detecting switch which detects the locked state of the shutter lever 28 in correspondence with the movement of a projecting piece 51 which is a portion of the second link piece 37 moving in relation to the opening/closing operation of the shutter lever 28.

The processing operation of the composite card reader structured as described above will be described in the following.

Normally, the card inlet 13 is at the open state permitting insertion of the card, with the shutter lever 28 kept at an elevated state. When a customer inserts the card 12 into the card inlet 13 in this open state, the card insertion detecting switch SW1 detects the card. Then, when the card is pushed inward, the front end of the card 12 is brought into contact with the card receiving member 22 of the slider 19 projecting in the card path 18, so that the slider 19 is moved forward against the force of the spring 21. When the customer pushes the card until the card 12 reaches the slider stopper surface 23 which is the card processing position, then the completion of card insertion is detected by the card insertion completion detecting switch SW2. Accordingly, the locking solenoid 33 is turned on. The rear end surface of the inserted card 12 is engaged with the shutter lever 28 and the card is locked.

When this locked state is detected by the shutter lock detection switch SW3, then the contact brushes 25 are brought into contact with the IC contact points on the IC card, so as to carry out reading and writing of the card data.

When the data processing of the IC card is completed, then the lock releasing solenoid 31 is turned on. Consequently, the card inlet 13 is opened, permitting extraction of the card. When the extraction of the card is detected by the card insertion detecting switch SW1, the transaction of the IC card is completed.

Now, when the card is a magnetic card, then the data on the magnetic stripe are read by a magnetic head 26 during extraction of the magnetic card, after the card insertion completion detecting switch SW2 detects that the card reached the insertion completion position. In that case, the card is extracted with the rear end of the card held by fingers, so that the card can be extracted in a stable manner, enabling highly reliable processing of magnetic data.

During opening/closing of the shutter lever 28 for the insertion and extraction of the card 12, the engaging roller 38 is switched being rolling and in contact with the L-shaped engaging portions 41 and 44 of the shutter opening lever 30 and the shutter closing lever 32. Therefore, the shutter lever 28 opens and closes smoothly.

Even if an external force to extract the card is applied, for example by a customer keeping hold of the rear end of the card 12 during processing of the card data, the engaging roller 38 is smooth rolling and engaging to prevent direct influence of the external force to the inner engaging portions and to properly avoid increase of friction resistance on the portions. Consequently, the extraction of the card can be always carried out stably without generating any trouble in releasing the lock of the card.

As described above, smooth engaging operation can be provided by the rolling of the engaging roller avoiding friction resistance during opening/closing of the shutter lever. Therefore, the driving force of the lock releasing solenoid and the lock solenoid for engaging and disengaging operation can be set smaller, thereby reducing the size of the apparatus and reducing the cost thereof.

A controlling portion for controlling the above described card reader to carry out card lock only when an IC card is inserted and to enable extraction of the card directly after the insertion when a magnetic card is inserted may be provided to the above described card reader.

Figure 6A:
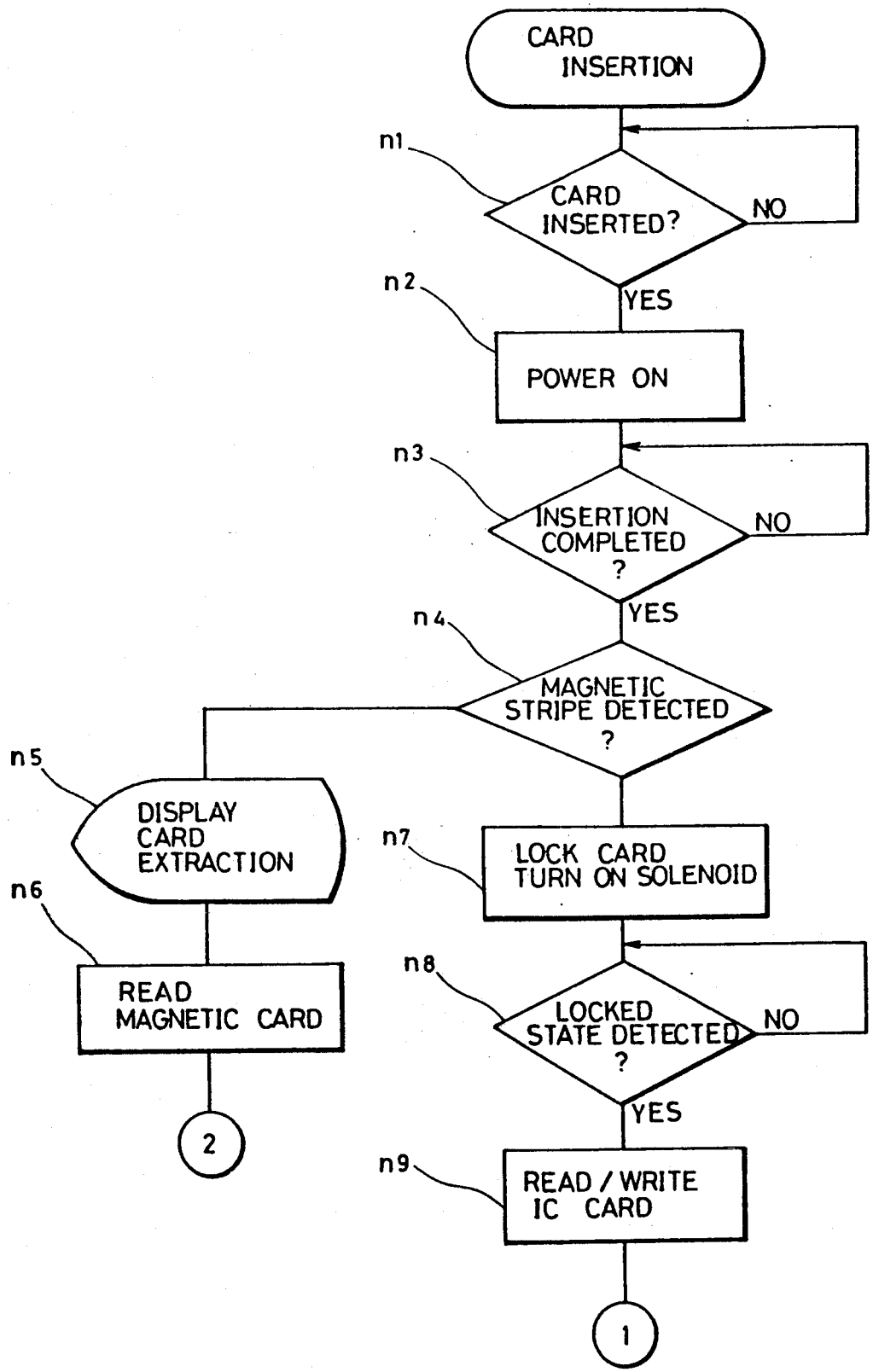
FIGS. 6A and 6B are flow charts illustrating an operation of an example of the composite type card reader in accordance with one embodiment of the present invention.
Figure 6B:
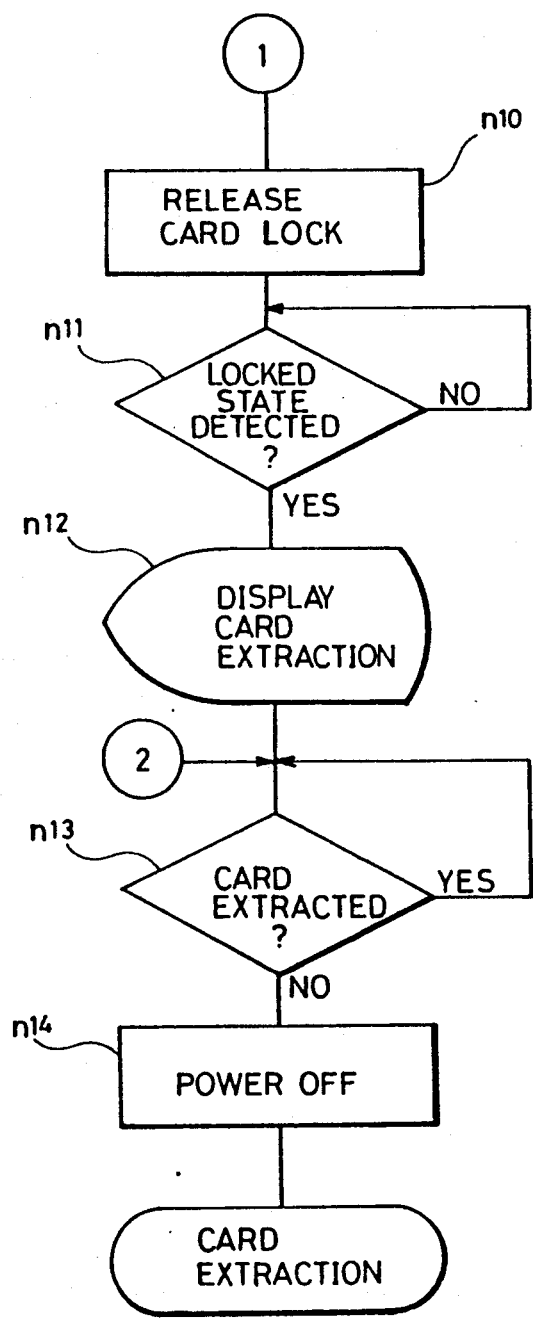

A card reader having such a control portion will be described in the following. The operation of such card reader will be described at first referring to the flow charts of FIGS. 6A and 6B.

When a card is inserted, the detecting switch SW1 detects the insertion based on the movement of the card insertion detection plate 16, and at the same time, the magnetic head 26 detects the magnetic stripe. At the time of completion of insertion, whether or not the inserted card has a magnetic stripe, namely, whether the card is a magnetic card or an IC card is determined (steps n1, n2, n3, n4).

When it is a magnetic card, the lock solenoid 33 is not operated, and a CPU1, which will be described later, immediately instructs extraction of the card by using a display 2. The magnetic head 26 reads the card information during extraction of the card (steps n5, n6).

When it is determined in the step n4 that the card is an IC card, then the locked solenoid 33 is operated for locking the card. The lock state is detected by the shutter lock detecting switch SW3, and the reading and writing of the IC card are carried out (steps n7, n8, n9).

Thereafter, the card locked state is released by a releasing solenoid 31 and the extraction of the card is instructed by display (steps n10, n11, n12).

When the extraction of the card is completed, the detecting switch SW1 is turned off and the process is completed (step n13), no matter whether it is the IC card or the magnetic card.

FIG. 7 is an electric circuit of the main portion of the present invention. The switches SW1, SW2 and SW3 are connected to the CPU1 through a PIO (interface) 3, and a driving circuit 4 for the locking and releasing solenoids 33 and 31 is also connected to be controlled by the CPU1.

The magnetic head 26 is connected to the CPU1 through an amplifier 5, an FM decoder 6 and an SIO (interface) 7, and an IC contact portion 25 is connected to the CPU1 through PIO 3.

The CPU1 drives the display 2 through the PIO 8, and a memory 9 stores necessary data.

Figure 8A:
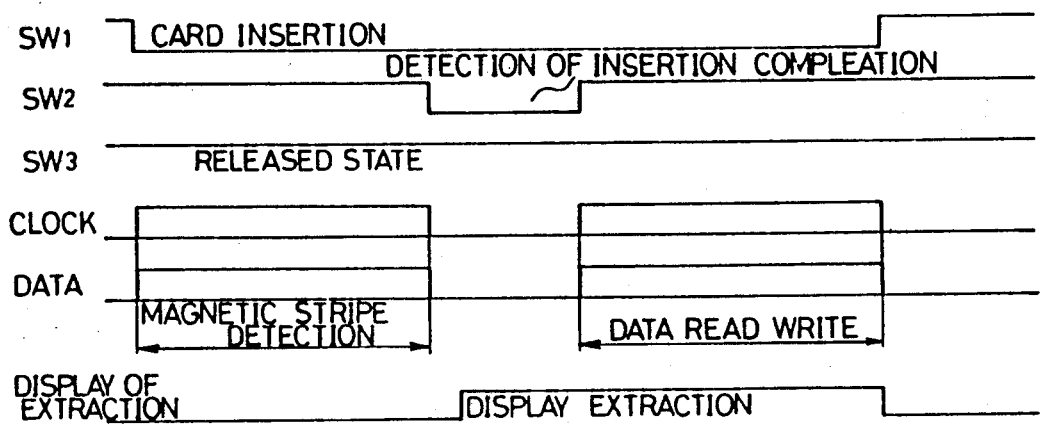
FIGS. 8A and 8B are timing charts of the electric circuits shown in FIG. 7.

FIG. 8A is a timing chart of the circuit shown in FIG. 7 when a magnetic card is used.

When the insertion of the card is detected by the switch SW1, then the magnetic head 26 carries out detection of magnetism from the magnetic stripe. The magnetic detection signal is applied to the CPU1. When the insertion of the card is completed, the CPU1 prevents operation of the locking solenoid 33 based on the detection of the magnetism, and it immediately instructs extraction of the card by using the display 2.

While the customer extracts the card, the magnetic head 26 reads and writes magnetic data.

Figure 8B:
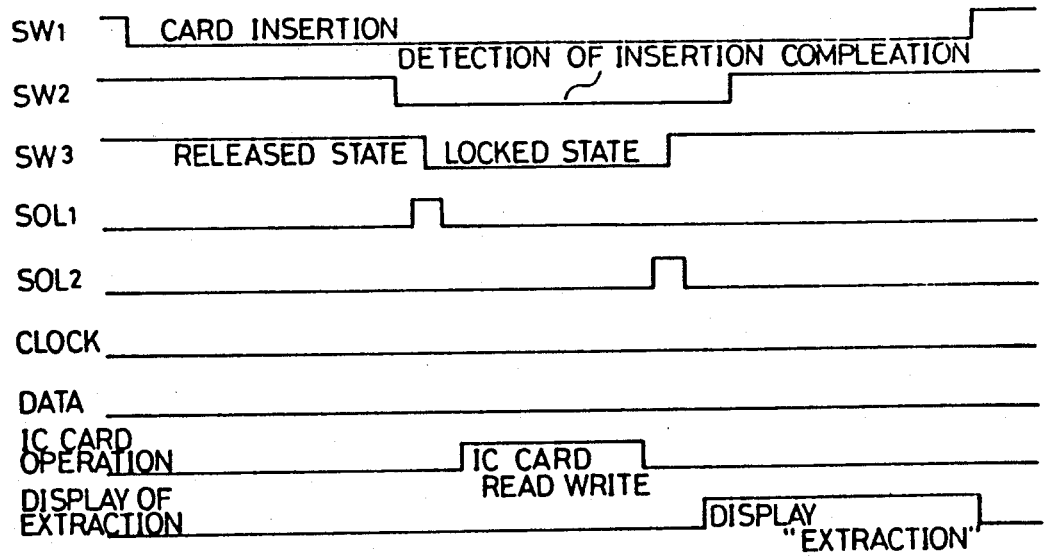

When an IC card is used, magnetism is not detected by the magnetic head 26 as shown in the timing chart of FIG. 8B. Therefore, when the insertion of the card is started and completed, the CPU1 operates the lock solenoid 33 to lock the card, and reading and writing of the IC card are carried out while it is locked. Thereafter, the lock releasing operation is carried out and the extraction of the card is instructed by display.

As described above, when a card is inserted, magnetic detection is carried out, and when the magnetic stripe is not detected, it is determined that an IC card is inserted, so that the card is locked. When a magnetic stripe is detected, then the card is not locked. Therefore, when the IC card is inserted, reading and writing can be carried out while preventing unexpected extraction. When a magnetic card is used, extraction is instructed simultaneously with the completion of insertion, enabling speedy reading and writing.

In addition, reading and writing of the magnetic card is carried out during the extracting operation in which there are smaller number of errors, so that the reliability in reading is high.

The controlling means for preventing locking of a magnetic card as described above can be applied not only to the card reader shown in FIGS. 1 to 5 but also to any card readers having locking mechanism.

A mechanism for supporting the magnetic head 26 will be described in the following. As shown in FIGS. 9 and 10, the magnetic head 26 is provided on a tip end of a movable frame 62. The movable frame is attached to support bases 65 and 66 by threading two screwlike support pins 63 and 64 penetrating the movable frame 62. In this mounted state, the movable frame 62 is swingable.

A spring member 68 is pressed by a vis 67 screwed to the support base 66 through the movable frame 62, an the movable frame 62 is resiliently pressed onto the support base 66 by means of the spring member. The upper surface 66a of the support base 66 is slightly tapered, and the movable frame 62 pressed thereto is inclined downward to the side of the magnetic head 26.

A downward projection 69 such as shown in FIGS. 11 and 12 is formed by pressing or the like at the rear end portion of the movable frame 62. The movable frame 62 swings with the contact portion of the projection 69 and the surface 65a of the support base 65.

In the above described structure, the support point of swing of the movable frame 62 is a contact point or a point of linear contact between the downward projection 69 and the surface 65a of the support base, so that the support point does not move even if the direction of swing of the movable frame 62 is changed. Therefore, the magnetic head 26 can respond to the magnetic card in smoother manner. The above described mechanism for supporting the magnetic head can be applied not only to the composite card reader but also to any magnetic reading/writing apparatus having a contact type magnetic head.

A mechanism for maintaining the lock released state after the card lock is released will be described in the following. In FIGS. 13 to 16, the same portions as shown in FIGS. 1 and 2 are denoted by the same reference characters. Portions other than the card locking mechanism, the lock releasing mechanism and the lock released state maintaining mechanism are the same as those shown in FIGS. 1 and 2, so that the description is not repeated.

Figure 13:
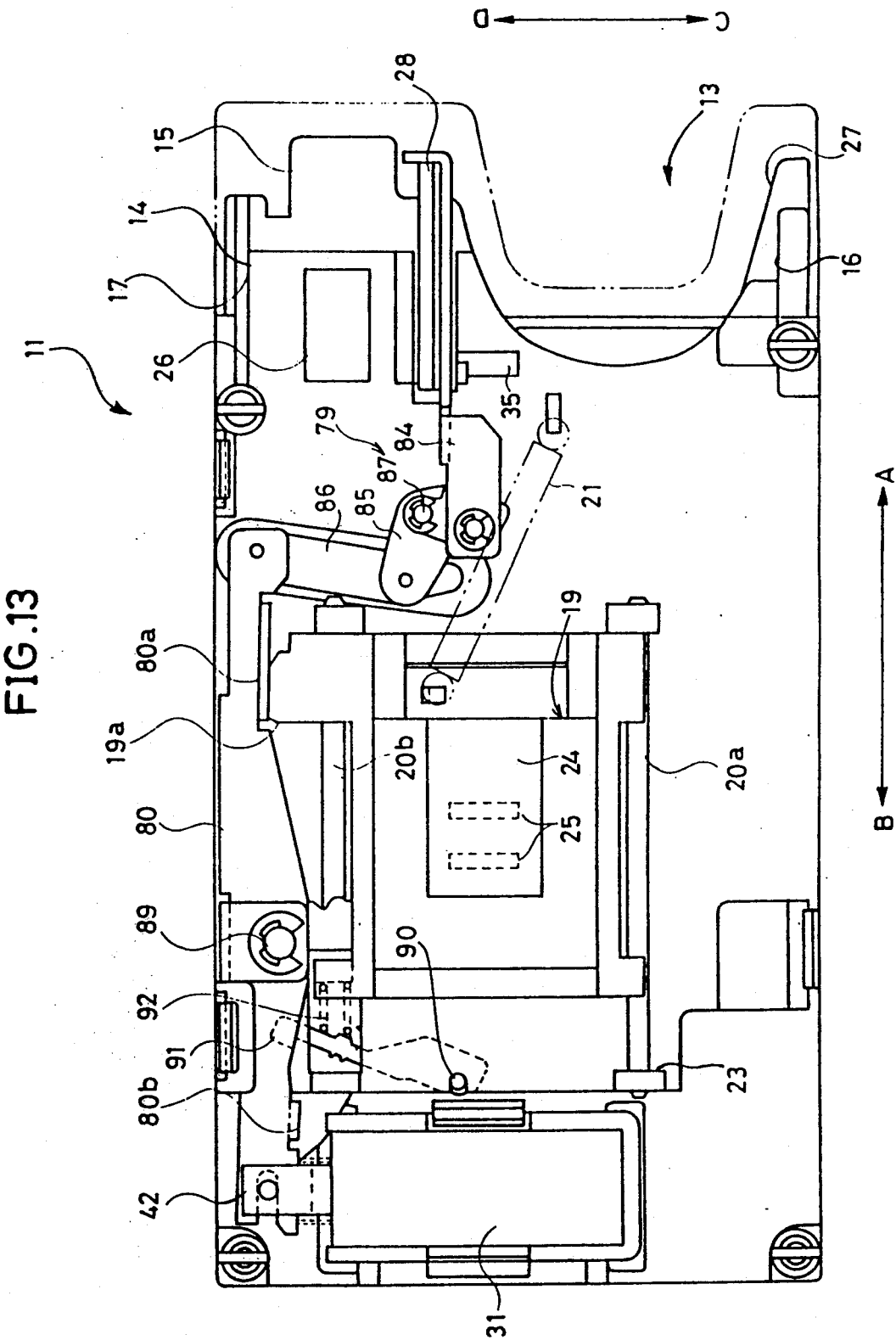
FIG. 13 is a plan view showing a standby state of a composite type card reader in accordance with another embodiment of the present invention.
Figure 14:
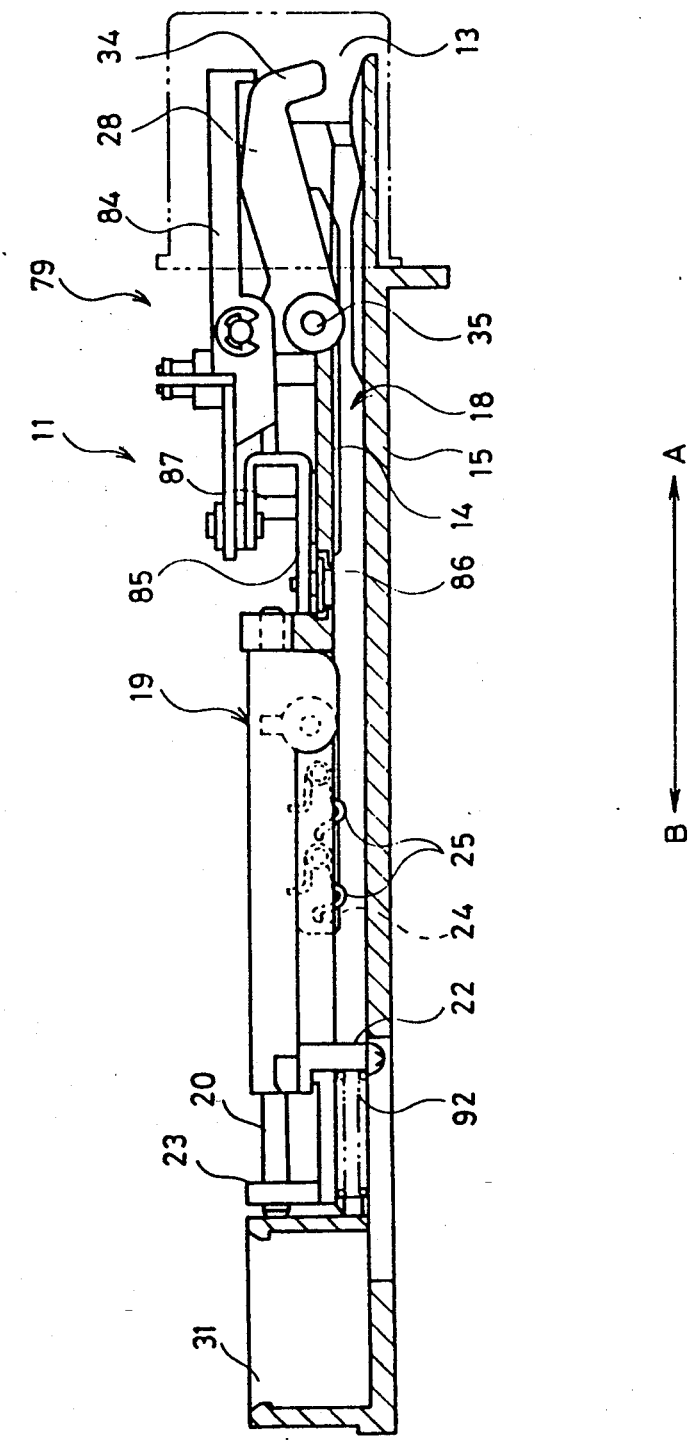
FIG. 14 is a cross sectional view thereof.

Referring to FIGS. 13 and 14, the shutter lever 28 has a shutter piece 34 bending downward on the chip end of the lever. The lever 28 is axially supported at the lower end portion on the B side by a pin 35 positioned horizontally in the directions shown by the arrows C and D on the upper surface of the upper plate 14. The upper end portion on the B side of the lever 28 is coupled to the first link piece 84 of a linking mechanism 79. The shutter lever 28 is turned with the pin 35, as the first link piece 84 is moved forward and rearward (directions shown by the arrows A and B). Consequently, the shutter piece 34 is moved upward and downward. When it is moved upward, the shutter piece 34 opens the card inlet 13. When it is moved downward, it closes the card inlet 13.

The above mentioned link mechanism 79 is consisted of continuously and pivotally attached first to third link pieces 84 to 86. More specifically, a front portion of the first link piece 84 is pivotally attached to the above mentioned shutter lever 28 and the rear portion thereof is pivotally attached to one end of the L-shaped second link piece 85. The other end of the second link piece 85 is pivotally attached to one end of the third link piece 86. The other end of the third link piece is pivotally attached to a shutter linked lever 80 which will be described later. The central portion of the L-shaped second link piece 85 is rotatably and axially supported on the upper plate 14 by means of a support pin 87. When the second link 85 is turned with the support pin 87 serving as the support point, the first link piece 84 is moved in response, and the shutter piece 34 of the shutter lever 28 is moved upward and downward.

A first position regulating piece 80a is provided projecting from an inner surface of an end portion on the A side of the shutter linked lever 80. In the normal standby state, when the slider 19 is at the standby position, the position regulating piece 80a is in contact with the initial position regulating piece 19a of the slider 19, regulating the shutter linked lever 80 at the initial position. When the slider 19 is moved forward, the position regulating piece 80a and the initial position regulating piece 19a are moved apart from each other to release the regulation of the position.

Normally, when the slider 19 is at the standby position, the position regulating lever 91 is being pulled to the side of the standby position (the direction shown by the arrow A) by means of the coil spring 92.

Figure 15:
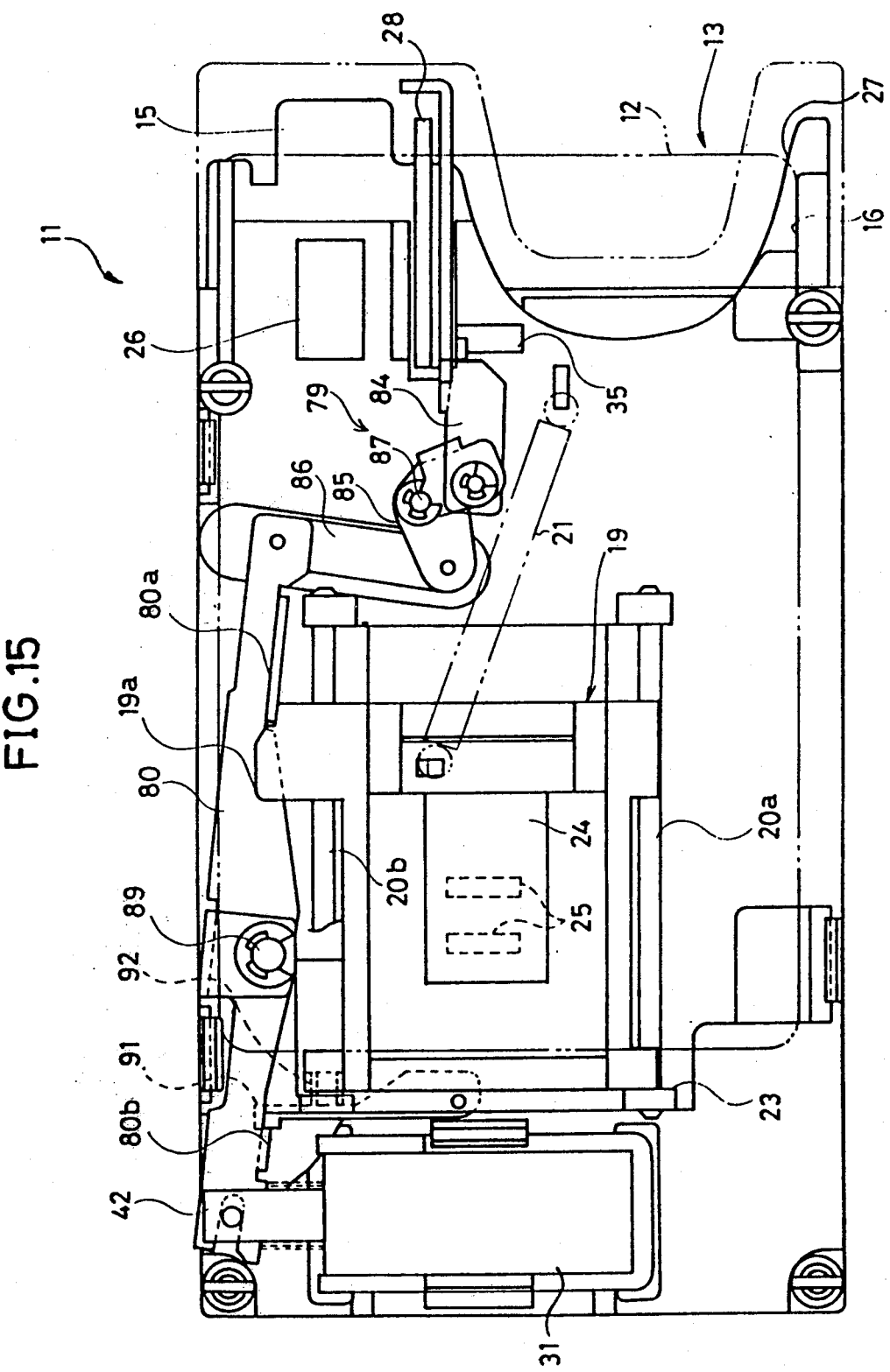
FIG. 15 is a plan view of the composite type card reader shown in FIG. 13 in a card locked state.

The coil spring 92 is pressed by the slider 19 when it is moved in the direction of the arrow B and biased to the side of the second position regulating piece 80b. In this biased state, the second position regulating piece 80b and the position regulating lever 91 are in disengaged state. When the card data processing is completed and the solenoid 31 is turned on to incline the shutter linked lever 80 to the open direction, the position regulating lever 91 is engaged with the second position regulating piece 80b in response to the movement of the lever 80 as shown in FIG. 15. Consequently, the open state is locked.

In this open lock state, at the start of the movement of the slider 19 in the direction of the arrow A, the initial position regulating piece 19a of the slider 19 meets with the first position regulating piece 80a of the shutter linked lever 80, with the open lock state of the position regulating lever 91 maintained. Therefore, the open lock state is maintained. Thereafter, as the slider 19 is moved in the direction of the arrow A, the open lock state on the side of the position regulating lever 91 is released.

In such a composite card reader 11 as described above, the first position regulating piece 80a is engaged with the initial position regulating piece 19a as shown in FIG. 13, and the shutter linked lever 80 is regulated to the initial standby position in parallel to the direction of insertion/extraction of the card. Consequently, the shutter piece 34 of the shutter lever is moved upward, and the card inlet 13 is kept at the open lock state.

When the customer inserts the card 12 into the card inlet 13 in this state, the front end of the card 12 reaches the card receiving member 22 projecting to the card path 18 of the slider 19. The slider 19 is moved forward (direction shown by the arrow B) against the biasing force of the spring 21, and it is pushed inward until it reaches the slider stopper surface 23 corresponding to the card processing position.

At this time, as shown in FIG. 15, the initial position regulating piece 19a of the slider is moved apart from the first position regulating piece 80a in response to the forward movement of the slider 19, so that the position regulation of the shutter linked lever 80 is released, the shutter lever 28 is moved downward by the weight of itself through the shutter linked lever 80 and the link mechanism 79, and the rear end of the inserted card 12 is locked by the shutter piece 34. Reading and writing of the card data are carried out in this locked state.

Figure 16:
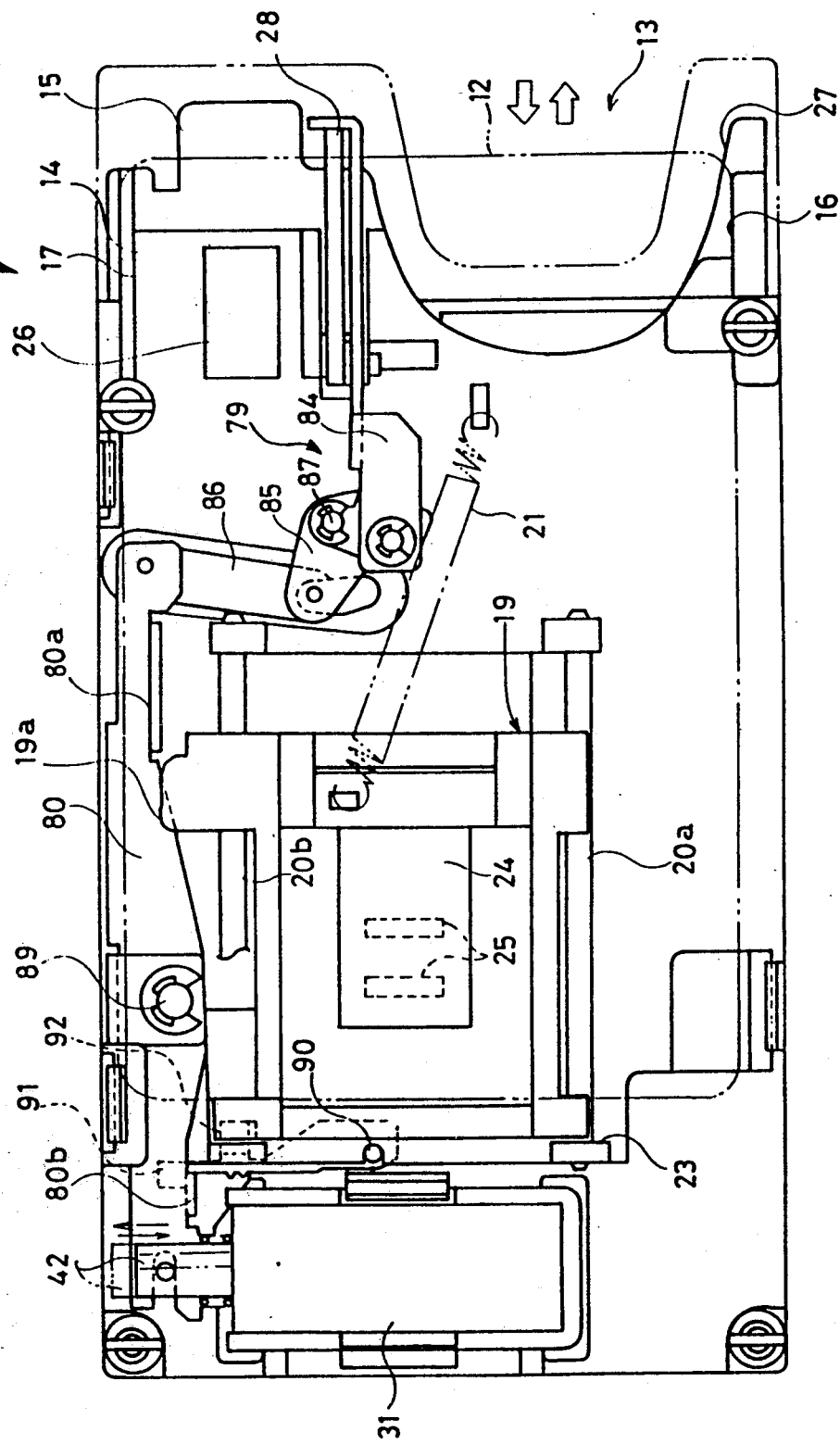
FIG. 16 is a plan view of the composite type card reader shown in FIG. 13 in a card lock released state.

When reading and writing from and to the card 12 are completed, the solenoid 31 is temporarily turned on. In response to the turning on, the shutter piece 34 of the shutter lever 28 is moved upward through the shutter linked lever 80 and the link mechanism 79. When the solenoid 31 is turned on, the second position regulating piece 80b is engaged with the position regulating lever 91, and the shutter linked lever 80 is regulated to the initial position as shown in FIG. 16. Consequently, the card inlet 13 is open locked, permitting extraction of the card. When the card is extracted, the magnetic head is brought into contact with the magnetic head 26 so as to carry out processing of the magnetic data.

When the card 12 is extracted, the slider 19 is returned to the original standby position by the function of the spring 21. On this occasion, when the initial position regulating piece 19a of the slider and the first position regulating piece 80a are brought into contact with each other to realize open lock as shown in FIG. 13, then the engagement of the second position regulating piece 80b and the position regulating lever 91 is released from that time on, while the shutter linked lever 80 is regulated at the position as it is. Consequently, the shutter lever 28 is maintained at the elevated state, and the open lock state is maintained. In this manner, the card inlet 13 is maintained in an open state, ready for the next insertion of the card.

As described above, when the card is extracted, the shutter lever is open locked by the open locking operation of the shutter lever, and therefore, even if the extraction of the card is delayed, the shutter lever is not locked again, so the card can be surely extracted.

The release operation of the card lock by the shutter lever is carried out by temporarily turning on the solenoid when the lock is released. However, in the OFF state thereafter, the lock release state is maintained stably by the open lock structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A card reader, comprising:
    a housing (14, 15, 16 and 17) having an inlet (13) through which a card (12) is inserted, for accepting the card (12) inserted through said inlet (13);
    a slider (19) provided in said housing (14, 15, 16 and 17), said slider being moved from a standby position to a second position when the card is inserted through said inlet (13), said slider being moved from its second position to its standby position when the card is extracted through said inlet;
    shutter means (28) movable between opened and closed positions for opening and closing said inlet (13), respectively;
    a shutter linked lever (80) which is pivotably mounted with respect to said housing, said shutter linked lever being pivotably movable between first and second positions, wherein said shutter linked lever and said shutter means (28) are arranged such that said shutter means is in its opened position when said shutter linked lever is in its first position and such that said shutter means is in its closed position when said shutter linked lever is in its second position, and wherein said shutter linked lever is maintained in its first position by said slider when said slider is in its standby position;
    driving means (31) for moving said shutter linked lever (80) to its first position; and
    an engaging member (91) for engaging said shutter linked lever (80) and for thereby maintaining said shutter linked lever in its first position when said shutter linked lever is moved to its first position by said driving means (31), wherein said engaging member (91) remains engaged with said shutter linked lever (80) and thereby maintains said shutter linked lever in its first position as said slider (19) moves from its second position toward its standby position.

2. A card reader according to claim 1, wherein said engaging member (91) is disengaged from said shutter linked lever (80) when said slider (19) is in its standby position.

3. A composite type card reader having a card accepting portion (18), a magnetic head (26), and IC contact portion (25) and a locking mechanism (28 and 33) for locking a card accepted in said card accepting portion (18), comprising:
    determining means (1) for determining whether or not magnetism is detected by said magnetic head (26);
    means for operating said locking mechanism in response to a determination by said determining means (1) that magnetism is not detected by said magnetic head (26), and for prohibiting operation of said locking mechanism (28 and 33) in response to a determination by said determining means (1) that magnetism is detected by said magnetic head (26); and
    means for reading data from said magnetic head (26) during extraction of said card from said card accepting portion (18).

4. A card reader, comprising:
    a housing (14, 15, 16 and 17) having an inlet (13) through which a card (12) is inserted, for accepting the card inserted through said inlet;
    a slider (19) provided in said housing, said slider being moved from a standby position to a second position when the card is inserted through said inlet (13), said slider being moved from its second position to its standby position when the card is extracted through said inlet;
    shutter means (28) movable between opened and closed positions for opening and closing said inlet (13), respectively;
    a shutter linked lever (80) movable between first and second positions, wherein said shutter linked lever and said shutter means (28) are arranged such that said shutter means is in its opened position when said shutter linked lever is in its first position and such that said shutter means is in its closed position when said shutter linked lever is in its second position, and wherein said shutter linked lever is maintained in its first position by said slider when said slider is in its standby position;
    driving means (31) for moving said shutter linked lever (80) to its first position; and
    an engaging member (91) for engaging said shutter linked lever (80) and for thereby maintaining said shutter linked lever in its first position when said shutter linked lever is moved to its first position by said driving means (31), wherein said engaging member (91) remains engaged with said shutter linked lever (80) as said slider (19) moves from its second position toward its standby position; and
    wherein said engaging member (91) is disengaged from said shutter linked lever (80) when said slider (19) is in its standby position; and
    wherein said shutter linked lever has a first position regulating piece (80a), and wherein said slider has a second position regulating piece (19a), and wherein said second position regulating piece (19a) is in constant contact with said first position regulating piece and thereby maintains said shutter linked lever in its first position when said slider is in its standby position.

* * * * *